(12) United States Patent
Redekop et al.

(10) Patent No.: US 7,717,778 B2
(45) Date of Patent: May 18, 2010

(54) SEPARATING COBS FROM GRAIN IN A CORN HARVESTER

(75) Inventors: Leo Redekop, Saskatoon (CA); Dean Mayerle, Saskatoon (CA)

(73) Assignee: Redekop Enterprises Inc., Saskatoon, Saskatchewan (CA)

( * ) Notice: Subject to any disclaimer, the term of this patent is extended or adjusted under 35 U.S.C. 154(b) by 3 days.

(21) Appl. No.: 12/276,826

(22) Filed: Nov. 24, 2008

(65) Prior Publication Data
US 2009/0137295 A1 May 28, 2009

Related U.S. Application Data

(60) Provisional application No. 60/989,859, filed on Nov. 23, 2007.

(51) Int. Cl.
*A01F 12/32* (2006.01)
(52) U.S. Cl. .................................... 460/101
(58) Field of Classification Search ................. 56/13.5, 56/16.5, 16.6, 120, 194, 473.5; 460/98, 100, 460/101, 23, 114, 102, 902, 93–96; 209/394, 209/397, 398, 22, 28, 134–138, 139.1, 142
See application file for complete search history.

(56) References Cited

U.S. PATENT DOCUMENTS

| 3,680,291 | A | | 8/1972 | Soteropulos |
| 4,186,160 | A | | 1/1980 | Landreth |
| 4,466,447 | A | | 8/1984 | Hoefer |
| 4,548,213 | A | | 10/1985 | Phillips |
| 4,600,019 | A | | 7/1986 | McBroom |
| 4,892,505 | A | | 1/1990 | Shrawder |
| 5,256,106 | A | | 10/1993 | Shrawder |
| 5,941,768 | A | * | 8/1999 | Flamme ...................... 460/114 |
| 6,358,141 | B1 | | 3/2002 | Stukenholtz |
| 6,379,243 | B1 | * | 4/2002 | Schumacher et al. ......... 460/101 |
| 6,468,154 | B1 | * | 10/2002 | Eggenhaus et al. .......... 460/101 |
| 7,566,266 | B1 | * | 7/2009 | Ricketts et al. .............. 460/101 |

* cited by examiner

*Primary Examiner*—Robert E Pezzuto
(74) *Attorney, Agent, or Firm*—Adrian D. Battison; Ade & Company Inc.

(57) ABSTRACT

A combine harvester for corn is adjusted so that the threshing system maintains the grain and cobs together and there is provided a first sieve to separate the grain and cobs from residue material which is discharged from a rear of the first sieve and a second sieve to separate the grain which passes through the second sieve from the cobs which are discharged from a rear end of the second sieve. The grain is transferred to a clean grain tank and the cobs are conveyed to a tank on a towed cart.

19 Claims, 6 Drawing Sheets

SEPARATING COBS FROM GRAIN IN A CORN HARVESTER

This application claims the benefit under 35 U.S.C. 119 from Provisional Application 60/989,859 filed Nov. 23, 2007.

This invention relates to combine harvesting machines arranged for harvesting corn and in particular to an arrangement in the combine harvester to separate the corn cobs from the grain.

BACKGROUND OF THE INVENTION

World ethanol production is expected to experience double-digit growth in the next years. Much of the growth is expected to occur in the United States where, with the current pace of expansion, the United States will be the leading producer of ethanol in the near future.

In the United States, ethanol is made almost exclusively from corn. As of December 2006, 16% of the United States corn crop was being used to displace 3% of the nation's annual gasoline consumption. The US government has a stated goal of reducing its dependence on foreign oil by 20%. If this reduction were to come entirely from corn based ethanol it would use up the nation's corn crop. As a result there has been a considerable amount of research in the production of ethanol from other sources.

Government and private sector scientists have been working on ways to produce ethanol from cellulosic material. Ethanol produced from switch grass, mixed prairie grasses and woody plants grown on marginal land could potentially meet the growing demand for green fuel. One leading company has targeted the collection of corn cobs, which is currently a waste material, as a cellulosic ethanol feed stock.

Current methods to collect whole cobs are very crude. A small number of farmers have built equipment to be mounted or pulled behind their combines for collecting the cobs separated from the grain. Work is being done to improve the construction of such towed collection devices so that this may become a viable technique.

Research in the feed value available from the entire corn field has determined that high moisture ear corn is equal to or better feed than corn grain for growing feeder cattle or dairy cows. This finding has the advantage of allowing a farmer to recover a higher tonnage of feed per acre than previously thought available. These farmers want to feed a mixture of corn grain and corn cobs to the cattle and now cellulosic ethanol companies are looking at this method of harvesting cobs with interest. Modification of existing corn grain combines is therefore desirable for collection of cobs.

A small number of innovators have experimented with what is known as Corn Cob Mix (CCM) technology. There are not any commercially available systems at this time, however a number of patents listed below teach how to adjust the threshing system of the combine to break the cobs into small sections. A number of different arrangements are then provided for modifying the separating system to collect a mixture of corn cobs and grain in the grain tank of the combine. In all cases the upper sieve is replaced with a CCM sieve and the lower sieve is removed allowing the cobs and grain to be collected below the sieve and transported to the grain tank.

Collection and storage of the mixture of grain and cobs using the CCM system is generally not an issue for a cattle feedlot or dairy operation, as these farmers generally have acquired the necessary equipment to store the feed. However the average corn grain farmer does not have this equipment.

Ethanol companies are looking at field side storage of cobs. These cobs may need to be stored in piles for up to 1 year before being used. The adaptation of the corn cob mix for ethanol use has a number of uncertainties and problems including storage of broken cobs which can lead to spoilage and increased field traffic. In most cases the volume yield of cobs is almost equal to that of the grain. This means that CCM equipped combines will be unloading twice as much as a corn grain harvester, leading to more operator stress, more trips by the grain cart to the combine and back to the pile and this can cause reduced future yields due to soil compaction.

The corn grain farmer will still require his corn separated from the cobs to properly store the grain and give him the marketing freedom of the higher valued corn. Field side separation of the corn from the cobs will be required. There are now 1800 bushel grain carts that can unload in less than 3 minutes commercially available, therefore a large surge tank will be required to handle a quick unload from a large grain cart. The field side separator will need to be very large, will be costly and difficult to move.

The following prior patents are concerned with this general field:

U.S. Pat. No. 6,358,141 (Stukenholtz) issued Mar. 19$^{th}$, 2002 discloses a combine collection system with at least two on-board bins and appropriate separation equipment to place corn grain in one tank and whole cobs in the second tank. An air supplied separating system is attached to the rear of the combine and the cobs are delivered via air pressure to the second tank placed on top of the combine.

This arrangement has not been and will not be widely commercially available due to the number of different combines in use today. Market acceptance of mounting a tank on top of the combine will be low and there will be issues with transportation and storage of the device.

U.S. Pat. No. 5,256,106 issued Oct. 26, 1993 and U.S. Pat. No. 4,892,505 issued Jan. 9, 1989 both of Shrawder each disclose a combine which is adjusted in the threshing system to reduce cobs to usable segments which are 1 to 3 inches long by adjusting threshing clearances. The material is fed to the cleaning shoe where grain is separated through the upper sieve and the cobs are rejected at the rear end of the upper sieve. An auger is added behind the upper sieve of the cleaning shoe for transportation of the separated cobs to a blower. A second auger is mounted parallel to the first behind the first to collect any missed cobs along with stems for further cleaning. Many single auger residue collection systems of this general type have been sold over the last years. The system, using one or two such augers, is however a very crude method of saving the cobs separated from the grain. There is very little adjustment for changing conditions.

U.S. Pat. No. 4,600,019 (McBroom) issued Jul. 15, 1986 and U.S. Pat. No. 4,548,213 (Phillips) issued Oct. 22, 1985 both disclose a combine which is adjusted to break all cobs into 1 to 3.5 inch pieces. An upper sieve is provided to allow the passage of grain and cobs through while discharging the remaining lighter material and plant debris over its end in a conventional manner. The lower sieve is removed and a mix of grain and cobs is stored in the combine's grain tank.

U.S. Pat. No. 4,466,447 (Hoefer) issued Aug. 21, 1984 discloses a combine which is designed with the tailings to be returned to the threshing section of the combine or at the operator's option to the cleaning section without passing through the threshing section.

U.S. Pat. No. 4,188,160 (Corbet) issued Feb. 12, 1980 discloses a residue saver in the form of an auger and trough which is shown mounted behind the combine's sieve. The residue saver can be adjusted by opening or closing a lower part of the trough to save all materials or only large residue such as cobs. The saved residue is blown into a trailing wagon.

This arrangement provides very little adjustment in that simply a hole is cut in the bottom of an auger trough near a fan and the heavy particles drop out and lights get sucked into the fan. This is not near enough control over the cleanliness of the corn cob sample.

U.S. Pat. No. 3,680,291 (Soteropulos) issued Aug. 1, 1972 discloses a specialized corn harvesting machine which harvests and chops up both the corn and the stover. The grain can be stored in a tank, and the stover is stored in the same of in a second tank or spread back on the ground

SUMMARY OF THE INVENTION

It is one object of the invention to provide a simplified method of harvesting corn cobs utilizing the combine's threshing system to break the cobs into small sections and then modifying the separating system in a different manner to collect the corn grain in the combine's grain tank and the corn cobs in a second tank which can be a larger trailing cart, thereby eliminating the need for field side separation and reducing compaction issues with reduced trips to a larger cob cart.

According to one aspect of the invention there is provided a combine harvester arranged for harvesting corn comprising:

a feeding system for feeding harvested ears of corn including grain, cobs and residue material;

a threshing system arranged for separating the grain from the cobs;

the threshing system being adjusted and arranged to maintain the separated grain and cobs together for feeding to a discharge of the threshing system;

a first sieve receiving the separated grain and cobs together from the discharge and arranged to separate the grain and cobs which pass through the first sieve from residue material which is discharged from a rear of the first sieve;

a second sieve below the first sieve receiving the separated grain and cobs together from the first sieve and arranged to separate the grain which passes through the second sieve from the cobs which are discharged from a rear end of the second sieve;

a first collection trough and first transverse auger therein for receiving the grain which passes through the second sieve;

a first conveyor arranged for receiving the grain from the first transverse auger and for transporting the grain to the grain tank;

a second collection trough and second transverse conveyor therein for receiving the cobs from the end of the second sieve;

and a second conveyor arranged for receiving the cobs from a second transverse conveyor and for transporting the cobs to a cob storage container.

In one preferred first embodiment, the first and second sieves are conventional sieves on the combine harvester adjusted and arranged such that the first sieve separates the grain and cobs which pass through the first sieve from residue material which is discharged from a rear of the first sieve and the second sieve separates the grain which passes through the second sieve from the cobs which are discharged from a rear of the second sieve and wherein the second conveyor is the conventional tailings auger of the combine harvester. By the term "conventional sieve" is intended the conventional sieve arrangement as provided on a typical combine harvester which is adjusted and arranged to carry out the function as stated. This is intended to include an upper corn cob sieve.

This embodiment can be provided without any other separation. In corn harvest a typical combine runs nothing in the return elevator, therefore the arrangement herein should not require any secondary separation.

In a second preferred embodiment, the first and second sieves are conventional sieves on the combine harvester adjusted and arranged such that the first sieve separates the grain and cobs which pass through the first sieve from residue material which is discharged from a rear of the first sieve and the second sieve separates the grain which passes through the second sieve from the cobs which are discharged from a rear of the second sieve and wherein the second conveyor is the conventional tailings auger of the combine harvester. An arrangement to separate remaining grain from the cobs is attached to the end of the second conveyor. Remaining grain passes through the separator to the tailings return elevator and the remaining cobs are transported to the storage device.

Optionally in the above first and second embodiments, the first conventional sieve could be replaced by a specialized cob sieve for the CCM harvest, and then replaced by the conventional sieve when harvesting other crops.

In a third preferred embodiment, the first sieve comprises an additional sieve added to the combine harvester and the second sieve is a conventional upper sieve of the combine harvester and there is a third sieve below the second sieve receiving the separated grain from the second sieve and arranged to separate the grain which passes through the third sieve from the residue which is discharged from a rear of the third sieve.

In this third embodiment preferably the third sieve is a conventional lower sieve of the combine harvester which delivers the residue from the rear end thereof to the convention tailings auger of the combine harvester.

In this third embodiment preferably the second conveyor is located behind the conventional tailings auger.

In this third embodiment preferably there is provided a kit of parts for attachment to the combine harvester comprising the additional sieve and the second conveyor for transporting the cobs.

Optionally in all of the above embodiments, a post cob cleaning mechanism is utilized after the cobs are delivered by the second conveyor.

Preferably in all of the above embodiments, the cobs are delivered to a second tank which can be mounted to the combine or pulled behind the combine.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
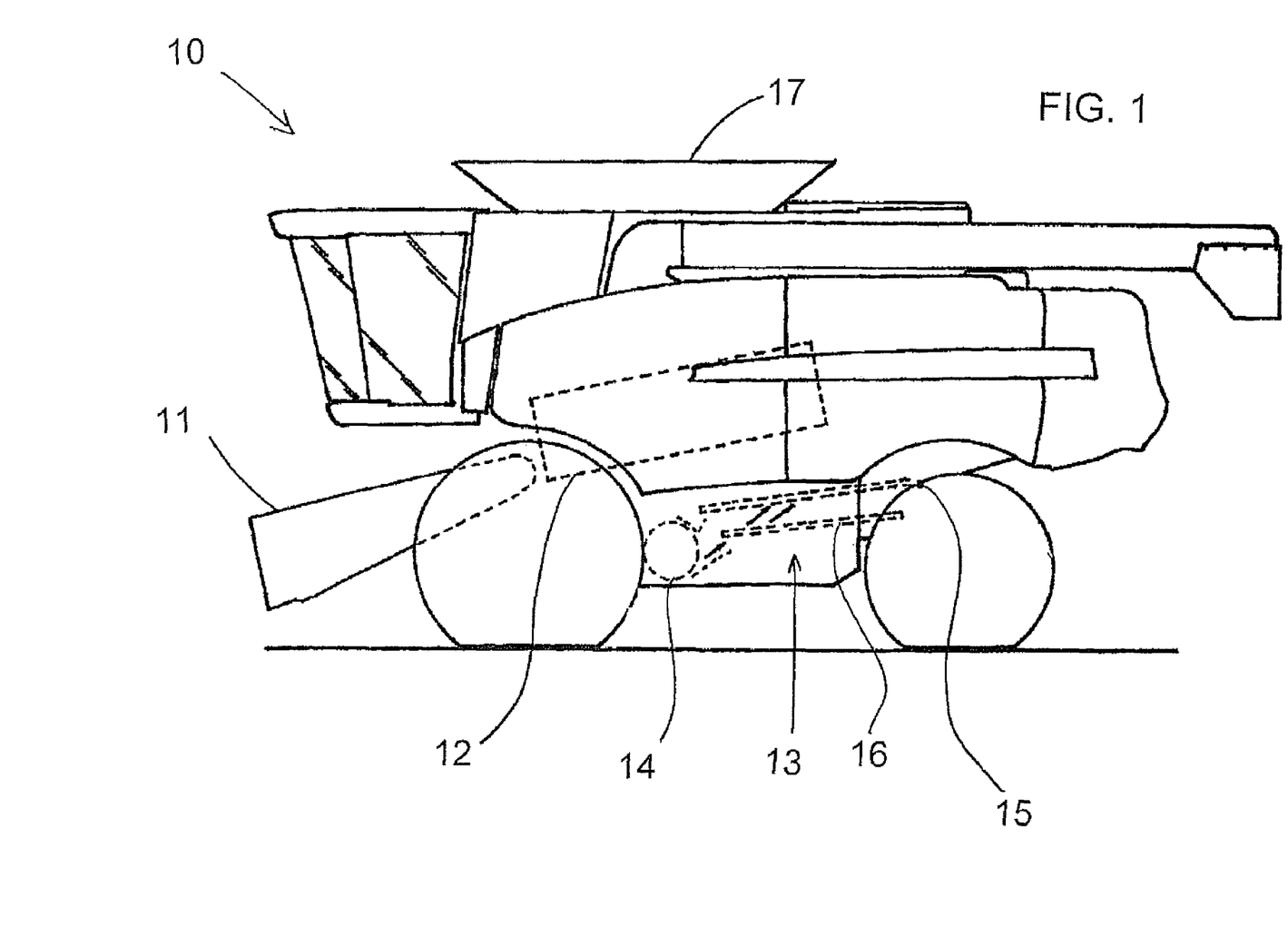
FIG. 1 is a side elevational view showing schematically a conventional Prior Art combine harvester.
Figure 2:
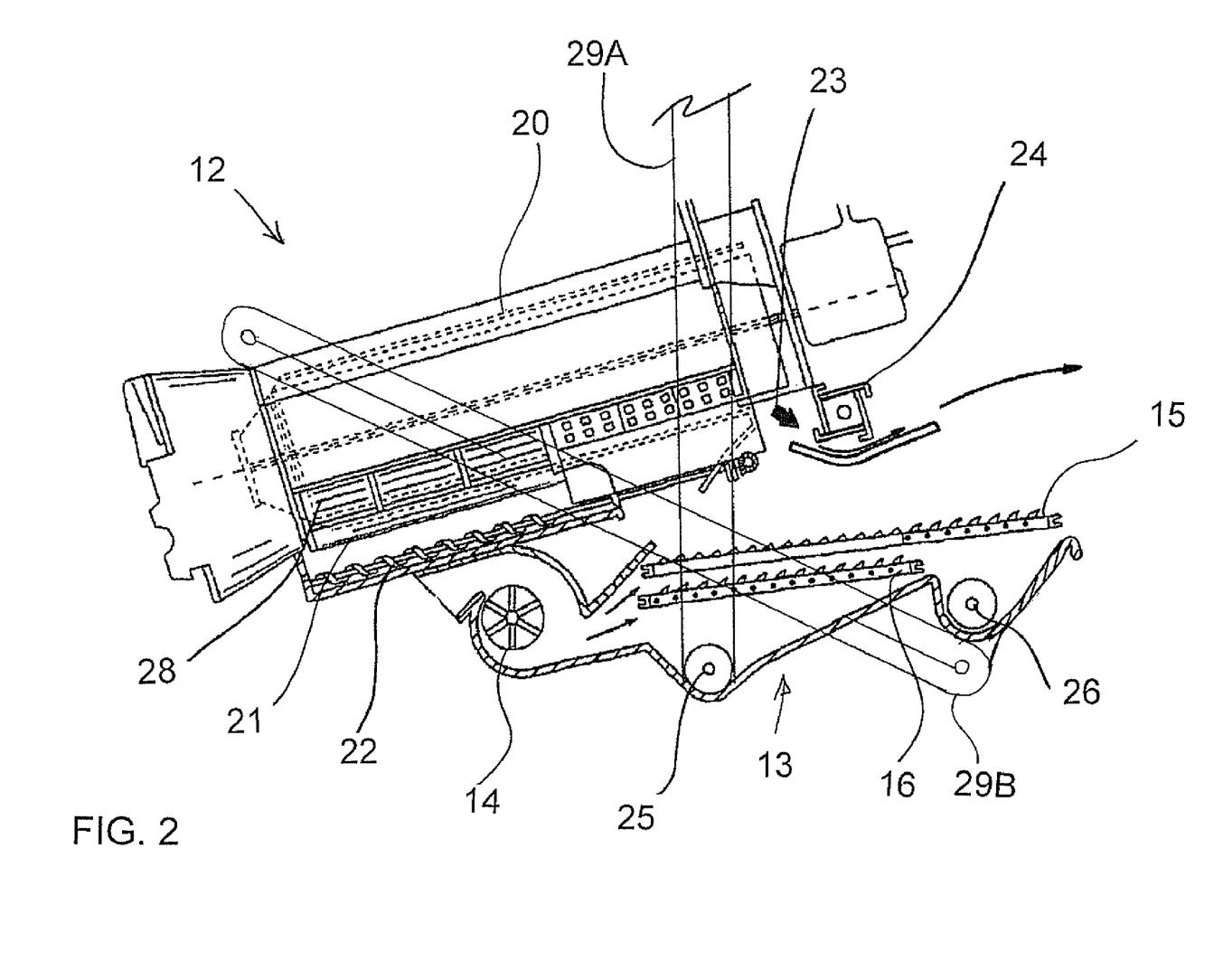
FIG. 2 is a side elevational view showing schematically the internal operating components of the conventional Prior Art combine harvester.

Referring to FIGS. 1 and 2 a typical conventional Prior Art combine harvester 10 is shown. The combine includes a feeder house 11 to bring the corn and cobs into the harvester from a cutting or picking header not shown. The corn is delivered to the rotary type threshing system 12 for separating of the corn grain from the cobs and remaining residue. The rotary threshing system is typical although there are many different types of threshing systems and variations thereof with which the present arrangement can be used.

The rotor 20 rubs the corn grain off of the cob on the concave 21. Cobs and large residue exit the rear end 23 of the threshing system and are discharged into a beater 24, or optionally a chopper, which propels the residue from the rear end of the combine. At the front end of the rotor grain falls through openings 28 in the concave to augers 22 below which moves the grain and chaff to the grain separating system 13. The separating system includes a fan 14 for generating airflow, an upper sieve 15 for separating the corn grain from material other than grain, and a lower sieve 16 for screening the grain for a final cleaning. A transversely extending grain auger 25 gathers the clean grain and moves it across the machine and out one side of the machine to a grain elevator 29A, which deposits the grain in the grain tank 17 (FIG. 1).

A transversely extending tailings auger 26 parallel to and symmetrical to the auger 25 carries any grain or chaff that has passed through the first sieve 15 but not the second sieve 16 to one side of the machine to a tailings elevator 29B similar to the elevator 29A, which leads back to the inlet of the threshing unit 20 for further processing.

Figure 3:
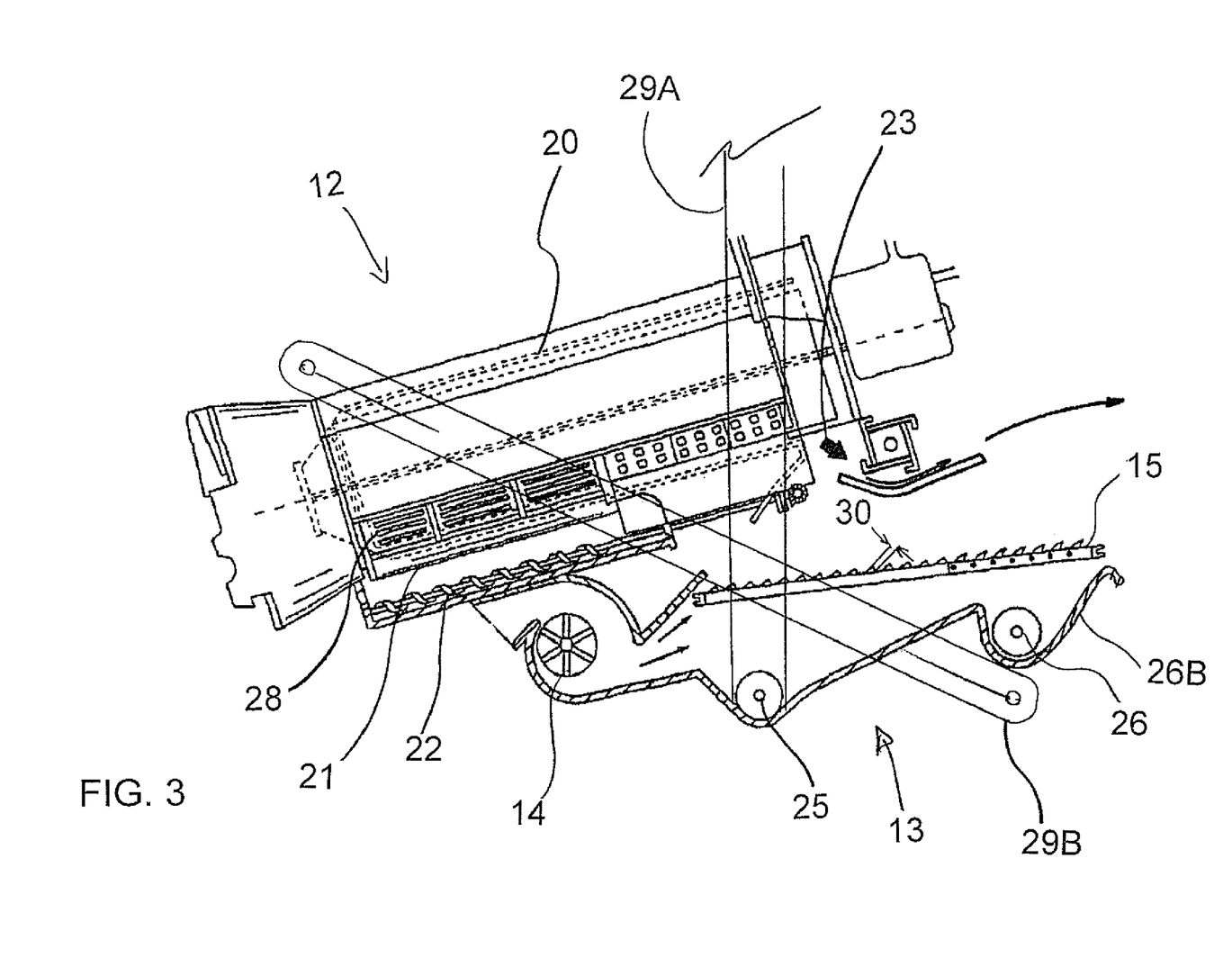
FIG. 3 is a side elevational view showing schematically the internal operating components of the conventional Prior Art combine harvester modified in accordance with a prior art arrangement for harvesting mixed grain and cobs.

Referring to FIG. 3, the same combine harvester arrangement of FIGS. 1 and 2 is shown but in this case the combine is modified using the above mentioned Corn Cob Mix (CCM) harvester arrangement. This technology is known to persons skilled in this art so that the details of the settings and modifications necessary are not part of the present invention and therefore are not described and shown in detail herein.

The CCM system is set-up to reduce the clearance between the rotor 20 and the concave 21. The concaves are altered in this system by creating larger openings 28 than in a typical grain machine to reduce the cobs to segments, which fall through the openings 30 in the upper sieve 15.

In operation of this system, the corn grain is threshed from the cobs and the cobs are broken into small segments. The grain and the corn cobs segments then fall to the augers 22 to be conveyed to the upper sieve 15. With this arrangement, now only the large leaves and any plant stems that have entered the combine exit out the rear end of the rotor 23.

For the typical CCM harvester system, the upper sieve 15 is adjusted wide open or replaced with a specialized cob sieve so that the cob segments and the grain fall through the sieve. The bottom sieve is removed and a mixture of corn grain and corn cobs is delivered to the elevator 29A by the auger 25. Any material containing grain or cobs that falls into the tailings trough 26B is returned to the threshing system 12 by tailings auger 26 and tailings elevator 29B.

Figure 4:
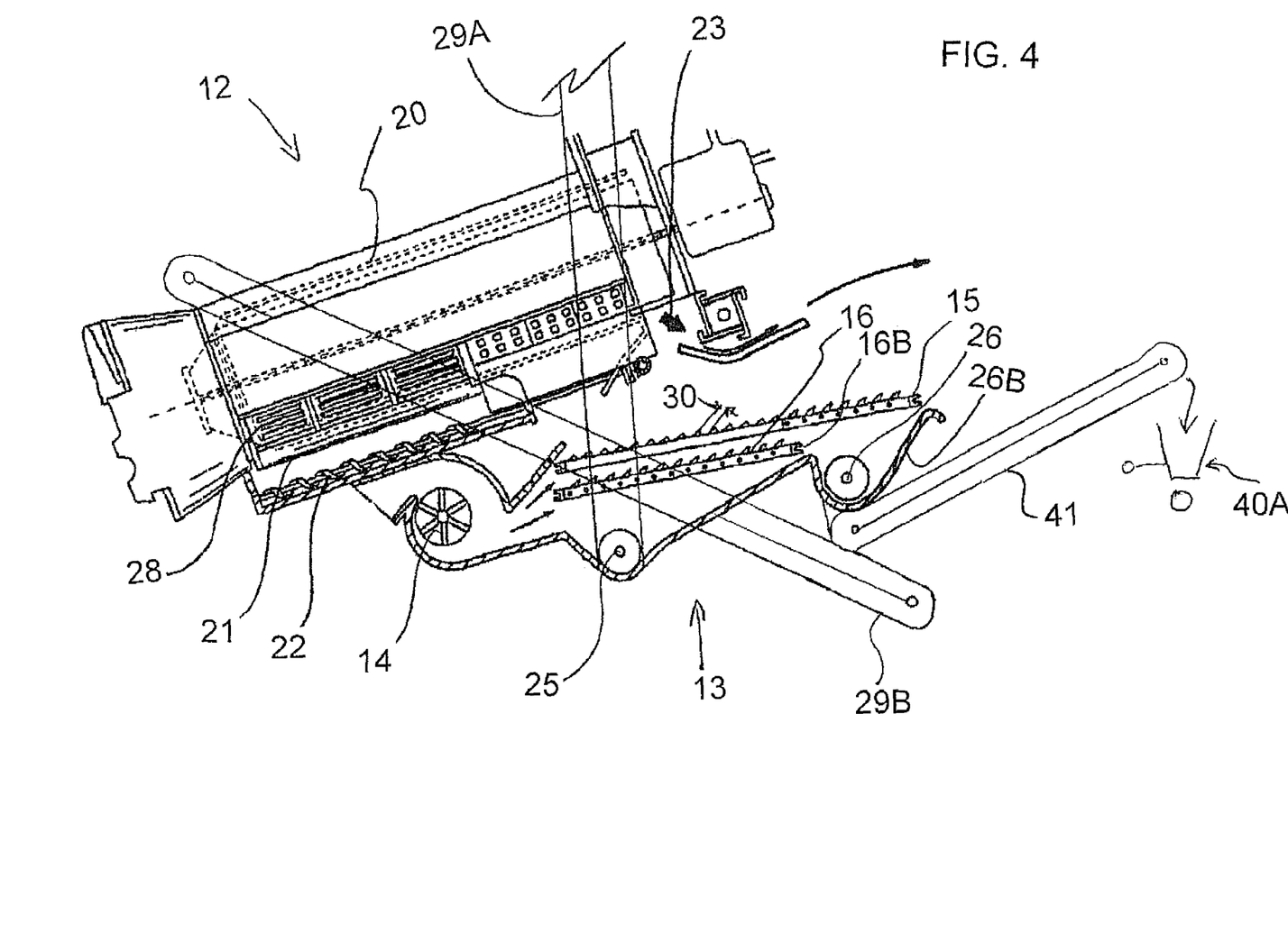
FIG. 4 is a side elevational view showing schematically the internal operating components of a combine harvester modified in accordance with a first embodiment of the present invention for harvesting separately grain and cobs.

Referring to a first embodiment of the present invention as shown in FIG. 4, the combine threshing system 12 is set-up as in FIG. 3 using the CCM system to separate the corn from the cob and to break the cob into segments.

The material containing the corn and cobs falls through the concaves 21 to the augers 22 and is conveyed to the upper sieve 15 as in FIG. 3. The upper sieve 15 has the openings 30 set large enough to allow passage of the corn and cobs through the sieve with the remaining chaff exiting the rear of the sieve as before.

The lower sieve 16 remains installed and screens the grain from the cob segments. All clean grain is moved to the elevator 29A by the cross auger 25. All cob segments and any other material that did not fall through lower sieve 16 exits the rear end 16B of the lower sieve and falls into the tailings trough 26B of the tailings cross auger 26.

The tailings elevator 29B does not receive the material from the transverse auger 29. An additional conveyor 41 is provided and has its inlet end connected to the outlet of auger 29 so that it receives the material from the auger 29 in preference to the tailings elevator 29B which may remain active, but shielded from the auger's material flow. The easiest way to achieve this is to extend the length of the auger 29 and create two outlets, one for the tailings return elevator 29B and the other for the conveyor 41. In this case, the operator selects where the flow goes. The conveyor 41 extends from the end of the auger 29 upwardly and rearwardly and acts to move the collected cob segments from the auger 29 upwardly and rearwardly along the conveyor 41 to a second storage tank shown schematically at 40A for cobs. Typically the conveyors including the conveyor 41 are of the type comprising a continuous chain wrapped at its upper and lower ends around sprockets with the chain carrying a series of paddles with a bottom edge which sweeps over a bottom surface of a conveyor duct in a conveying action. This type of conveyor is typically used in a combine harvester as the clean grain conveyor and as the tailing conveyor. Alternatively a pneumatic blower or other devices could be used to convey the cobs from auger 29 to the cob storage tank. The cob storage tank is preferably pulled behind the combine as a trailer to allow for greater capacity, less frequency in emptying, and less field traffic. However the tank 40A may be mounted in the combine itself.

Figure 5:
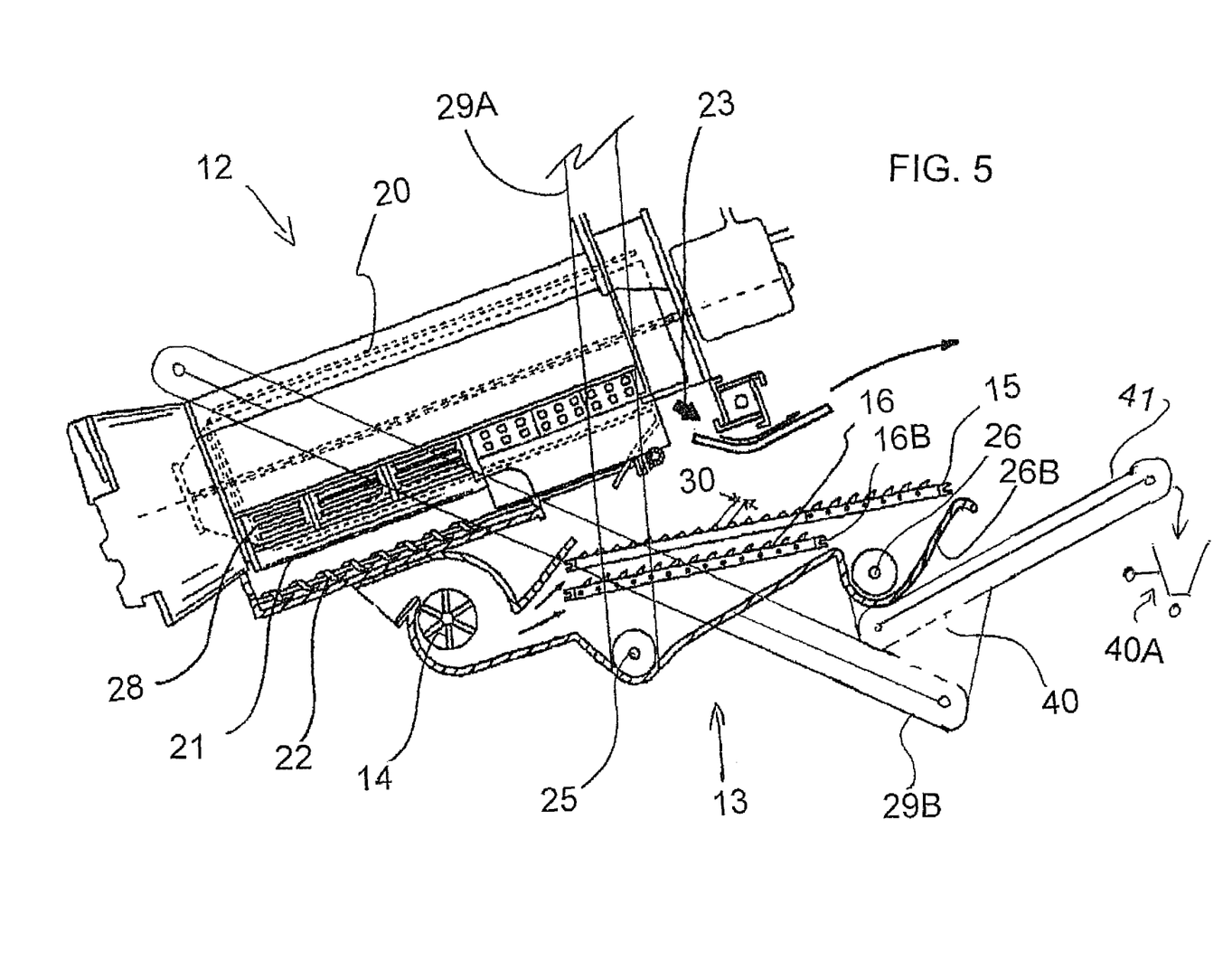
FIG. 5 is a side elevational view showing schematically the internal operating components of a combine harvester modified in accordance with a second embodiment of the present invention for harvesting separately grain and cobs.

Referring to FIG. 51 a second embodiment of the present harvester is shown. Like the harvester shown in FIG. 4 the combine is set-up to separate the corn from the cob and to break the cob into segments. The cob and corn material falls through the concaves 21 to the augers 22 to be carried to the cleaning system 13.

Like the harvester in FIG. 4, the lower sieve 16 remains installed and screens the grain from the cob segments. All clean grain is moved to the elevator 29A by the cross auger 25. All cob segments and any other material that did not fall through lower sieve 16 exits the rear end 16B of the lower sieve and falls into the trough 26B as before. The auger 26 moves the cob segments into a secondary separator 40, which removes any remaining grain from the cob sections. The grain passes through the separator and is dropped into the elevator 29B where it is returned to the threshing system 20 for further processing. The cob segments enter the conveyor 41 and are moved to a second storage tank shown schematically at 40A for cobs. In one simple embodiment, the separator 40 is a ½" square grating on the floor of conveyor 41 so that the grain falls through to the elevator 29B and the cobs remain in the conveyor. Other more complex separation arrangements can be used.

Figure 6:
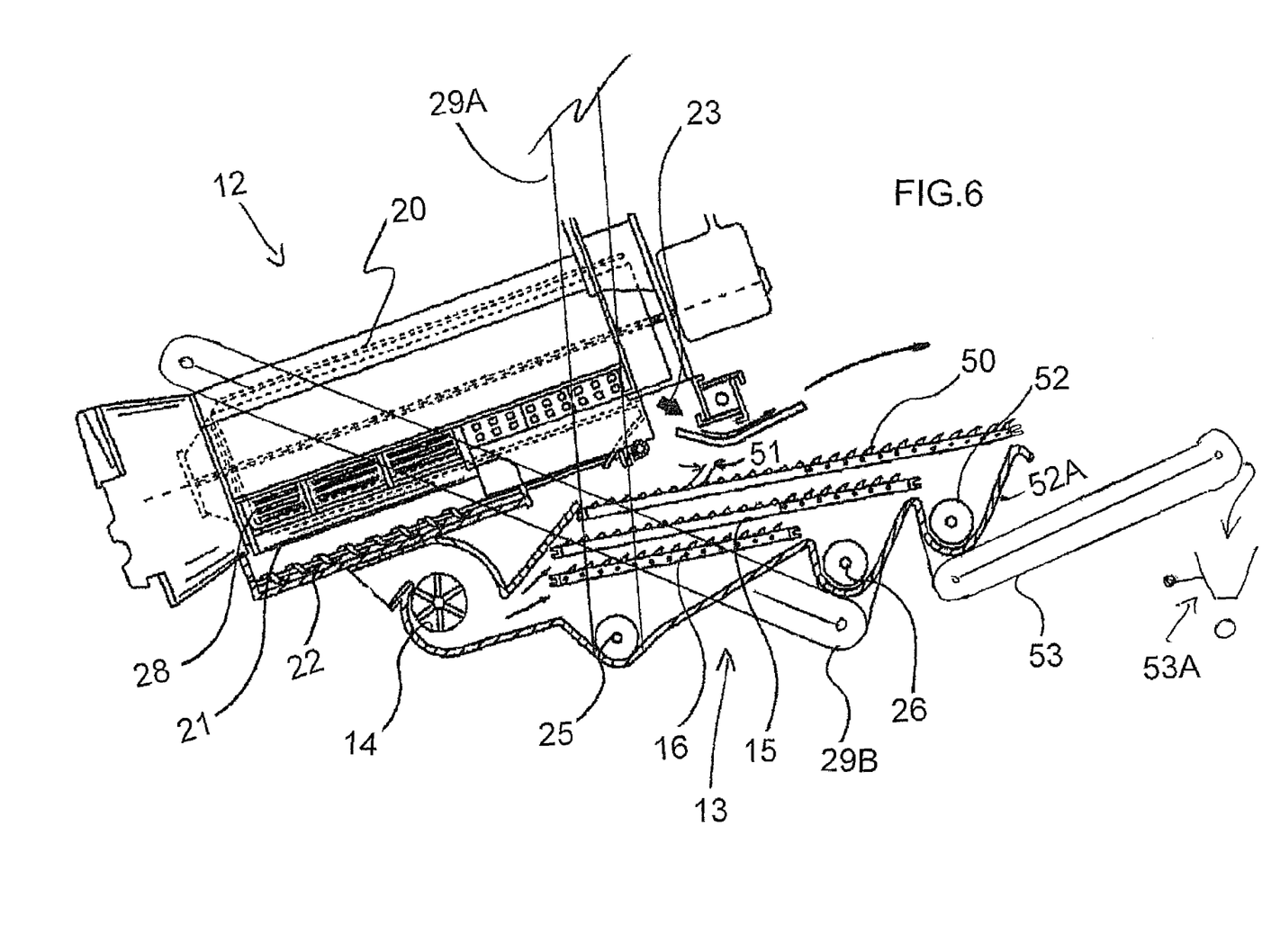
FIG. 6 is a side elevational view showing schematically the internal operating components of a combine harvester modified in accordance with a third embodiment of the present invention for harvesting separately grain and cobs.

Referring to FIG. 6, a third embodiment of the harvester of the present invention is shown. Like the embodiments shown in FIGS. 4 and 5 the combine is set-up to separate the corn from the cob and to break the cob into segments. The cob and corn material falls through the concaves 21 to the transport mechanism 22 to the cleaning system 13. The conventional sieves 15 and 16 remain in place. An additional corn cob sieve 50 is mounted above the upper sieve 15 with openings 51 set large enough to allow passage of the corn and cob material through the sieve with the remaining chaff exiting the rear of the sieve 50.

The standard upper sieve 15 and the lower sieve 16 below the additional sieve 50 receive the corn and cob material and are set as typical for harvesting corn grain. The auger 25 for the clean grain gathers the grain and moves it out one side of the machine to the clean grain elevator 29A, which deposits the grain in the grain tank 17. A tailings auger 26 returns any grain or chaff or small cob segments that have passed through the standard upper sieve 15 but not the lower sieve 16 to the conventional tailings elevator 29B, which leads to the input of the threshing unit 20 for further processing.

The separated cob segments exit the rear end of the standard upper sieve 15 and fall into an additional cob transverse conveyor 52, which is typically an auger but can be other types of conveyor, in an additional trough 52A. The trough 52A and the conveyor 52 are parallel to the conventional trough 26B and auger 26 and are mounted behind them.

The cobs are conveyed from conveyor 52 by a transport conveyor 53, which may be of the same type as the conveyor 41 of FIG. 4, or may be pneumatic blower, or other transport arrangement, to a second storage tank shown schematically at 53A. As before, the cob storage tank is either mounted on the combine or pulled behind the combine as a trailer to allow for greater capacity, less frequency in emptying, and less field traffic.

An additional cob separator 53B, using air flow separation techniques, may be required to clean up the cobs to remove chaff and other debris as they are transferred to the tank 53A or as they enter the tank 53A. This separation can be of the same type as is shown and described in co-pending application Ser. No. 12/252,104 filed Oct. 15$^{th}$, 2008 and assigned to the present assignees, the disclosure of which is incorporated herein by reference.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combine harvester arranged for harvesting corn comprising:
   a feeding system for feeding harvested ears of corn including grain, cobs and residue material;
   a threshing system arranged for separating the grain from the cobs;
   the threshing system being adjusted and arranged to maintain the separated grain and cobs together for feeding to a discharge of the threshing system;
   a first sieve receiving the separated grain and cobs together from the discharge and arranged to separate the grain and cobs which pass through the first sieve from residue material which is discharged from a rear of the first sieve;
   a second sieve below the first sieve receiving the separated grain and cobs together from the first sieve and arranged to separate the grain which passes through the second sieve from the cobs which are discharged from a rear end of the second sieve;
   a first collection trough and first transverse auger therein for receiving the grain which passes through the second sieve;
   a first conveyor arranged for receiving the grain from the first transverse auger and for transporting the grain to the grain tank;
   a second collection trough and second transverse conveyor therein for receiving the cobs from the end of the second sieve;
   and a second conveyor arranged for receiving the cobs from a second transverse conveyor and for transporting the cobs to a cob storage container.

2. The combine harvester according to claim 1 wherein the first and second sieves are conventional sieves on the combine harvester.

3. The combine harvester according to claim 1 wherein the second transverse conveyor comprises a tailings auger, wherein there is provided an elevator for transferring material from the tailings auger to an inlet of the threshing system and wherein the elevator is bypassed and the second conveyor is utilized.

4. The combine harvester according to claim 3 wherein there is provided a separation system at or after the second conveyor for separating the cobs from residue.

5. The combine harvester according to claim 1 wherein the second transverse conveyor comprises a tailings auger, wherein there is provided an elevator for transferring material from the tailings auger to an inlet of the threshing system and wherein there is provided a separation system for separating the cobs which are transported by the second conveyor from other materials which are transported on the elevator.

6. The combine harvester according to claim 1 wherein the first sieve comprises an additional sieve added to the combine harvester and the second sieve is a conventional upper sieve of the combine harvester.

7. The combine harvester according to claim 6 wherein there is a third sieve which is a conventional lower sieve of the combine harvester below the second sieve for receiving the separated grain from the second sieve and arranged to separate the grain which passes through the third sieve from the residue which is discharged from a rear of the third sieve and wherein the third sieve delivers the residue from the rear end thereof to a convention tailings auger of the combine harvester and a conventional elevator from the tailings auger to an inlet of the threshing system.

8. The combine harvester according to claim 7 wherein the second transverse conveyor is located behind the conventional tailings auger.

9. The combine harvester according to claim 1 wherein the cob storage container is mounted on the combine harvester.

10. The combine harvester according to claim 1 wherein the cob storage container is mounted on a cart which is pulled behind the combine harvester.

11. A combine harvester arranged for harvesting corn comprising:
   a feeding system for feeding harvested ears of corn including grain cobs and residue material;
   a threshing system arranged for separating the grain from the cobs;
   the threshing system being adjusted and arranged to maintain the separated grain and cobs together for feeding to a discharge of the threshing system;
   a first separation arrangement arranged to receive the separated grain and cobs together from the discharge and arranged to separate the grain and cobs which pass through the first separation arrangement from residue material which is discharged from a rear of the first separation arrangement;

a second separation arrangement after the first separation arrangement arranged to separate the grain from the cobs;

a first conveyor arranged for receiving the grain from the second separation arrangement and for transporting the grain to a grain tank;

a second conveyor for receiving the cobs from the second separation arrangement and for transporting the cobs to a cob storage container.

12. The combine harvester according to claim 11 wherein the first separation arrangement is a conventional sieve on the combine harvester.

13. The combine harvester according to claim 11 wherein the second separation arrangement is a conventional sieve.

14. The combine harvester according to claim 11 wherein the second separation arrangement is at or before the cob storage tank for separating the cobs from grain.

15. The combine harvester according to claim 11 wherein the first separation arrangement comprises an additional sieve added to the combine harvester and the second separation arrangement is a conventional upper sieve of the combine harvester.

16. The combine harvester according to claim 15 wherein there is a third sieve which is a conventional lower sieve of the combine harvester below the second sieve for receiving the separated grain from the second sieve and arranged to separate the grain which passes through the third sieve from the residue which is discharged from a rear of the third sieve and wherein the third sieve delivers the residue from the rear end thereof to a convention tailings auger of the combine harvester and a conventional elevator from the tailings auger to an inlet of the threshing system.

17. The combine harvester according to claim 16 wherein the second conveyor is located behind the conventional tailings auger.

18. The combine harvester according to claim 11 wherein the cob storage container is mounted on the combine harvester.

19. The combine harvester according to claim 11 wherein the cob storage container is mounted on a cart which is pulled behind the combine harvester.

* * * * *